United States Patent [19]
Mosby

[11] Patent Number: 5,560,715
[45] Date of Patent: Oct. 1, 1996

[54] ROLLING ELEMENT BEARING WITH SHIELD

[75] Inventor: Christopher W. Mosby, Calhoun, Ga.

[73] Assignee: The Torrington Company, Torrington, Conn.

[21] Appl. No.: 428,989

[22] Filed: Apr. 26, 1995

[51] Int. Cl.[6] .......................... F16C 33/76; B21D 53/10
[52] U.S. Cl. .................. 384/477; 29/898.11; 384/484; 384/488
[58] Field of Search ................ 29/898.11, 402.2; 384/477–488

[56] References Cited

U.S. PATENT DOCUMENTS

| | | | |
|---|---|---|---|
| 2,051,304 | 8/1936 | Leister et al. | |
| 3,627,391 | 12/1971 | Bingle | 384/482 |
| 4,113,328 | 9/1978 | Vander Meulen | 384/486 X |
| 4,458,958 | 7/1984 | Kapaan et al. | 384/538 |
| 4,643,594 | 2/1987 | Neder et al. | 384/478 |
| 4,664,538 | 5/1987 | Galbato | 384/477 |
| 4,669,895 | 6/1987 | Colanzi et al. | 384/477 |
| 4,692,826 | 9/1987 | Raj et al. | 360/97 |
| 4,928,371 | 5/1990 | Colanzi et al. | 29/898.11 X |
| 5,037,214 | 8/1991 | Dougherty | 384/571 |
| 5,051,003 | 9/1991 | Sasayama | 384/477 |
| 5,209,499 | 5/1993 | Ruff, Jr. et al. | 277/50 |
| 5,333,939 | 8/1994 | Krude et al. | 384/537 X |
| 5,333,956 | 8/1994 | Hoffman et al. | 384/483 |

*Primary Examiner*—Thomas R. Hannon
*Attorney, Agent, or Firm*—John C. Bigler

[57] ABSTRACT

A first periphery portion of a bearing shield contacts one of an inner ring or an outer bearing ring and a second periphery portion of the bearing shield is adjacent the other of the bearing rings. The first periphery portion of the bearing shield and said one bearing ring have at least one localized irregularity effected by a laser beam such that rotation of the bearing shield with respect to said one bearing ring is restrained. The localized irregularity may be a mechanical interlock or a welding of the two elements and may be at several locations evenly distributed circumferentially about the first periphery of the bearing shield.

20 Claims, 2 Drawing Sheets

5,560,715

ROLLING ELEMENT BEARING WITH SHIELD

BACKGROUND OF THE INVENTION

This invention relates generally to rolling element bearings and, more particularly, to a bearing shield suitable for extreme applications characterized by high rotational force on the bearing shield.

A bearing shield may be provided in a rolling element bearing assembly to close a side of the bearing so as to retain lubricant, to exclude foreign matter, to provide a more uniform outer bearing configuration, and to otherwise guard the rolling elements. The bearing shield is usually formed of metal and may incorporate provision for a resilient seal engaging the opposite bearing ring. Various bearing shield designs have been proposed, including some that have an interference or press fit of a lip of the bearing shield in a groove of a bearing ring to retain the bearing shield in the rolling element bearing.

Although such proposed bearing shields have achieved a simple axial installation with a degree of axial and radial retention, those designs have not always provided sufficient rotational retention. That is, the torque required to rotate the bearing shield with respect to the grooved outer bearing ring may be inadequate to prevent relative rotation. And, due to dimensional variations resulting from production tolerances, the torque required to rotate the bearing shield with respect to the grooved outer bearing ring is difficult to control with previous bearing shield designs.

Welding has not been used to attach a bearing shield to a rolling element bearing because of the detrimental effects of heat required to effect a weld between the bearing shield and a bearing ring. Typically the bearing rings are formed of heat-treated high carbon steel, and heat during welding could destroy the desired hardness and durability of the bearing ring, causing premature bearing failure. Also, rolling or sliding bearing surfaces may be damaged or welded together during the welding process, especially when electrical welding is used and arcing occurs between the rolling elements and the bearing rings.

The foregoing illustrates limitations known to exist in present rolling element bearings. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a rolling element bearing assembly having an axis, rolling elements between inner and outer bearing rings, and an annular bearing shield. A first periphery portion of the bearing shield contacts one of the bearing rings and a second periphery portion of the bearing shield is adjacent the other of the bearing rings. The first periphery portion of the bearing shield and said one bearing ring have at least one localized irregularity effected by a laser beam such that rotation of the bearing shield with respect to said one bearing ring is restrained.

In another aspect of the present invention, this is accomplished by providing a method for mounting a bearing shield in a rolling element bearing assembly.

The foregoing and other aspects will become apparent from the following detailed description of the invention when considered in conjunction with the accompanying drawing figures.

BRIEF DESCRIPTION OF THE DRAWING FIGURES

FIG. 1 is a cross-sectional view illustrating a first embodiment of the rolling element bearing with shield of the present invention, including an optional second bearing shield; and FIGS. 2, 3, 4 and 5 are partial cross-sectional views illustrating additional embodiments of the rolling element bearing with shield of the present invention.

DETAILED DESCRIPTION

Figure 1:
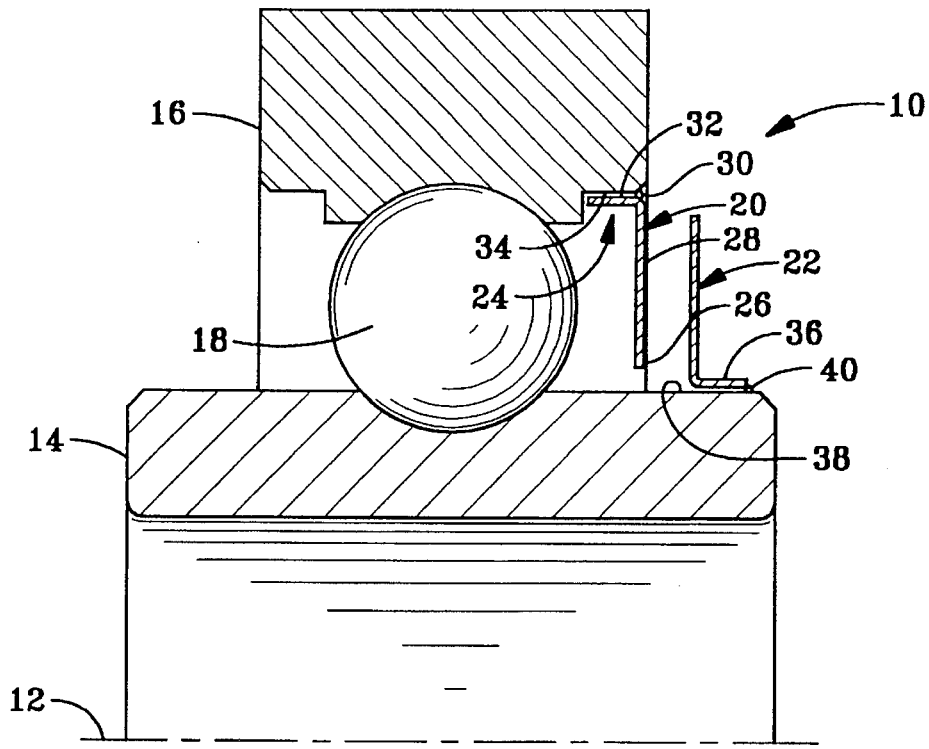

Referring now to the drawings, FIG. 1 illustrates rolling element bearing assembly 10 of the present invention having axis 12 and comprising inner bearing ring 14, outer bearing ring 16, rolling elements 18 between the bearing rings, annular bearing shield 20, and optional second bearing shield 22. Although rolling elements 18 are illustrated as balls, rollers and other types of rolling elements, either with or without bearing retainers, may be used with the present invention. Bearing shields 20 and 22 may be formed of low carbon steel or other similar material.

First periphery portion 24 of bearing shield 20 contacts either the inner or outer bearing ring, second periphery portion 26 of bearing shield 20 is adjacent the other ring, and mid portion 28 of bearing shield 20 is between first and second periphery portions 24 and 26. In the embodiment of FIG. 1, bearing shield 20 is fixed to outer bearing ring 16 and extends radially inwardly to substantially close the annulus between outer bearing ring 16 and inner bearing ring 14. Optional second bearing shield 22 is fixed to inner bearing ring 14 and extends radially outwardly, also closing the annulus.

First periphery portion 24 of bearing shield 20 and outer bearing ring 16 have at least one localized irregularity 30 effected by a laser beam such that rotation of the bearing shield with respect to outer bearing ring 16 is restrained. For example, irregularity 30 may be a weld joining the two elements at their axially outward point of contact, as illustrated in FIG. 1. Alternatively, the laser beam may disturb the material as a nodule on one of the elements and a corresponding recess in the other of the elements, or as a key providing a mechanical interlock, or as another form of irregularity that serves to inhibit relative rotation.

In contrast to traditional welding techniques, welding with a laser is more controllable with respect to the amount of heat generated and the localization of the heat to the precise area to be welded. As a result, elements of rolling element bearing assembly 10, such as the hardened races of inner and outer bearing rings 14 and 16 and the surfaces of rolling elements 18, for example, are not damaged during formation of irregularity 30. A pulse YAG laser with fiber optics or similar laser device may be used to weld or disturb the surface of the bearing elements with limited metallurgical transformation of the heat affected zone and with limited cracking during cooling.

Irregularity 30 is placed in one or more locations distributed circumferentially about outer bearing ring 16. The required number of locations is dependent upon the shear strength of the weld or nodule and can be calculated to achieve a desired "torque to rotate" for an intended application. An appropriate number of locations may be 3 to 6, for example, and the locations may be distributed evenly about the circumference of outer bearing ring 16. Automatic indexing machines may be used to facilitate efficient fixing of bearing shield 20 during assembly of rolling element bearing assembly 10.

In the embodiment of FIG. 1, first periphery portion 24 of bearing shield 20 includes flange 32, axially inwardly extending from irregularity 30, that is pressed into step or groove 34. The inner periphery portion of optional second bearing shield 22 includes flange 36, axially outwardly extending along seal land 38, and may form a press-fit with respect to seal land 38. The axially outward end of flange 36 is fixed to inner bearing ring 14 at irregularity 40, formed by a laser in a manner similar to that described with respect to the fixing of bearing shield 20.

The present invention is directed to a rolling element bearing with a shield that is fixed to either the inner or outer bearing ring by means of a laser. Although the embodiment of FIG. 1 has two bearing shields, one fixed to the inner bearing ring and one fixed to the outer bearing ring, it should be understood that either of the bearing shields may be used alone, or both together, in practicing this invention. Thus, "optional" second bearing shield 22 may be used without bearing shield 20 to provide a second embodiment of the invention.

Figure 2:
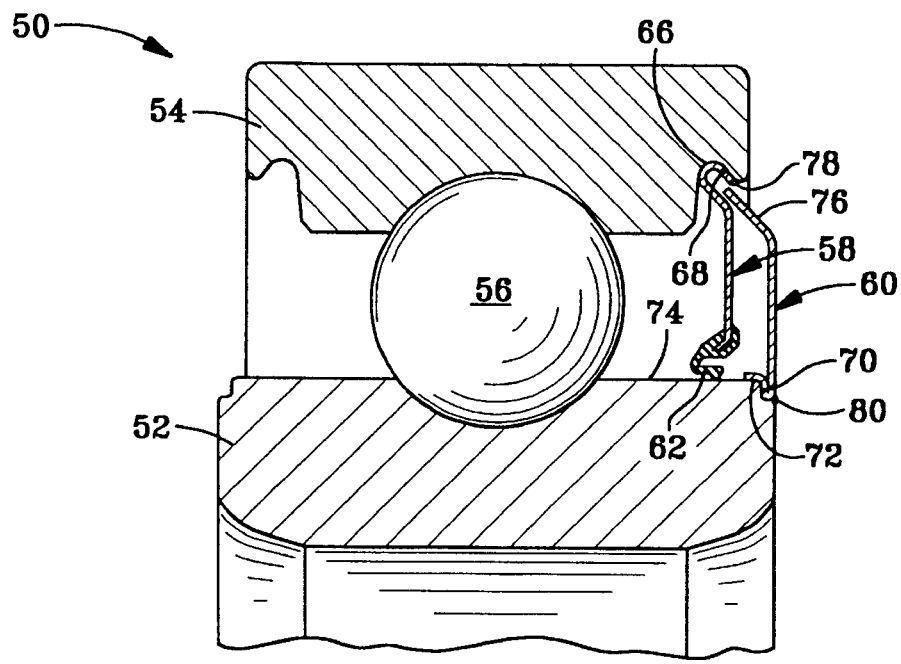

FIG. 2 illustrates rolling element bearing assembly 50 comprising inner bearing ring 52, outer bearing ring 54, rolling elements 56, first bearing shield 58, and second bearing shield 60, each being generally similar to corresponding elements of FIG. 1. Rolling element bearing assembly 50 further includes elastomeric seal 62 engaging seal land 64, mounted on first bearing shield 58, and illustrates variations in shield configurations.

Specifically, the outer periphery portion of first bearing shield 58 extends conically, radially outwardly and axially inwardly, to rolled portion 66 resiliently engaging groove 68 of outer bearing ring 54. And, the inner periphery portion of second bearing shield 60 is folded back on itself to engage groove 70 and form flange 72, extending axially inwardly over seal land 74. Outer periphery portion 76 of second bearing shield 60 extends conically, axially inwardly and radially outwardly. Irregularities 78 and 80 inhibit relative rotation and are similar to irregularities 30 and 40.

Figure 3:
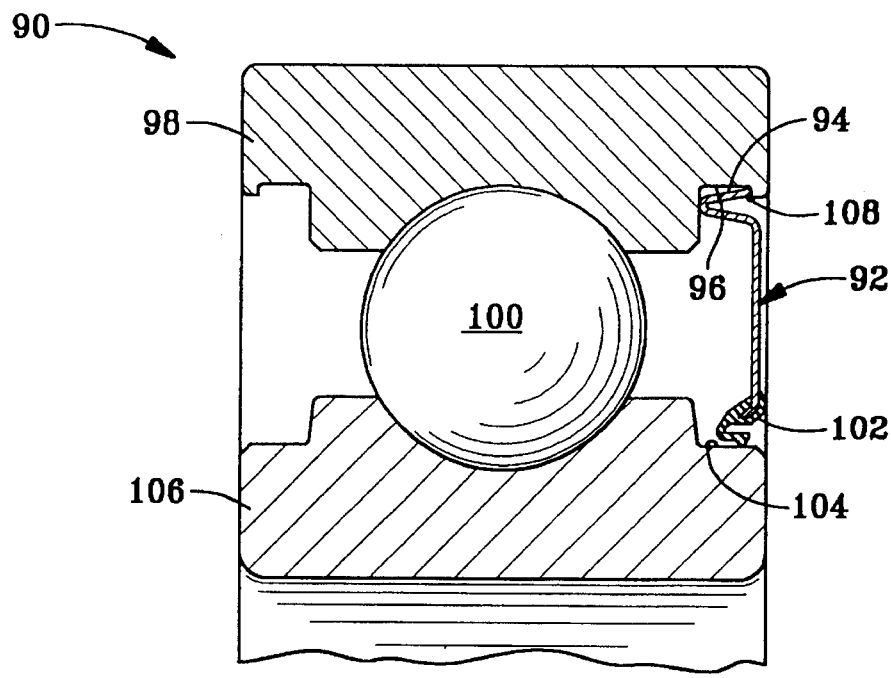

Rolling element bearing assembly 90 of FIG. 3 has bearing shield 92 with V-shaped outer flange 94 resiliently engaging groove 96 of outer bearing ring 98 and with a mid portion extending radially inwardly to substantially cover rolling elements 100. Elastomeric seal 102 is molded over the inner periphery portion of bearing shield 92 and engages recessed seal land 104 of inner bearing ring 106. Irregularity 108, similar to those of FIGS. 1 and 2, is formed by a laser and restrains relative rotation of bearing shield 92 and outer bearing ring 96. Preferably, the radially outward edge of flange 94 is formed with a radius, providing a surface perpendicular to the laser beam to minimize reflected radiation.

Figures 4, 5:
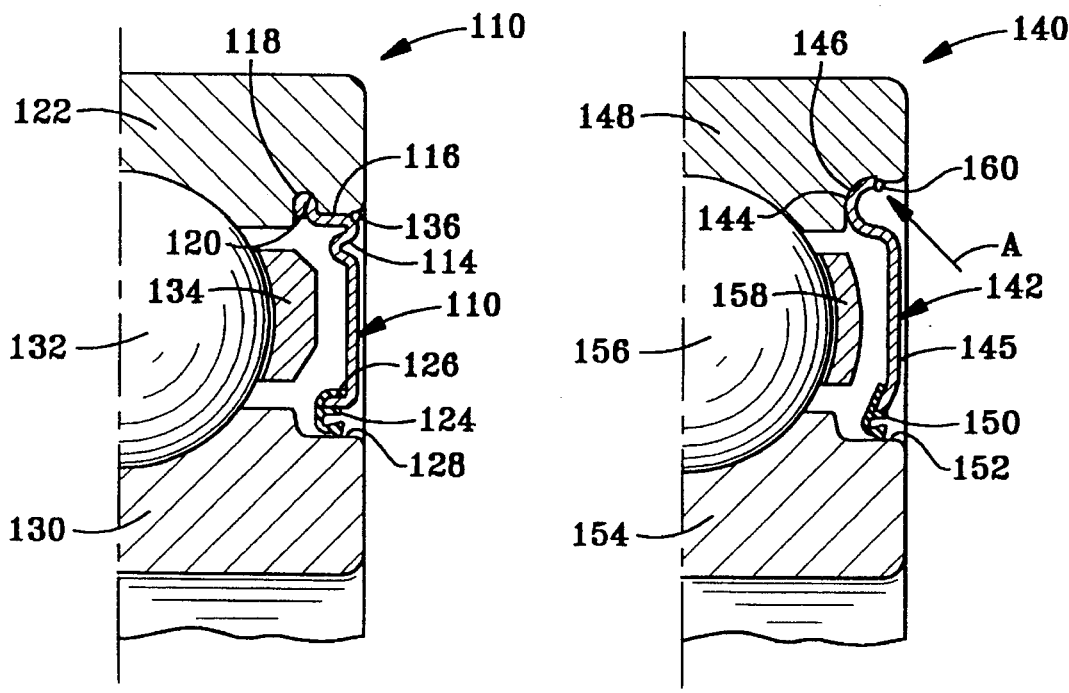

Rolling element bearing assembly 110 of FIG. 4 includes bearing shield 112 with annular corrugation 114 and an outer periphery portion with axially directed flange 116 and rolled edge 118 that resiliently engages groove 120 of outer bearing ring 122. Elastomeric seal 124 is molded over axially inwardly directed flange 126 in the inner periphery portion of bearing shield 112 and engages recessed seal land 128 of inner bearing ring 130. Rolling elements 132 are positioned by bearing retainer 134. Irregularity 136 is located at the axially outward limit of contact of bearing shield 112 with outer bearing ring 122, facilitating access by a laser.

Similarly, rolling element bearing assembly 140 of FIG. 5 includes bearing shield 142 with outer periphery rolled lip 144 offset axially inwardly with respect to mid portion 145 and resiliently engaging groove 146 of outer bearing ring 148. Elastomeric seal 150 is mounted over the inner periphery portion of bearing shield 142, in engagement with recessed seal land 152 of inner bearing ring 154, providing a seal over rolling elements 156 and bearing retainer 158. Arrows A indicate laser access to the outer periphery portion of bearing shield 142, facilitating forming of irregularity 160 anywhere along rolled lip 144 to restrain relative rotation.

From the above description, it will be apparent that the present invention provides an economical rolling element bearing with shield that is suitable for extreme applications characterized by high rotational force on the bearing shield. The bearing shield of the present invention is securely fixed to an inner or outer bearing ring without damage to the bearing races or the rolling or sliding surfaces of the bearing assembly, even when the bearing ring is formed of heat-treated high carbon steel.

Having described the invention, what is claimed is:

1. A rolling element bearing assembly having an axis and comprising:

an inner bearing ring;

an outer bearing ring;

rolling elements between the inner and outer bearing rings; and an annular bearing shield having a first periphery portion contacting one of the inner and outer bearing rings, a second periphery portion adjacent the other of the inner and outer bearing rings, and a mid portion between the first and second periphery portions;

the first periphery portion of the bearing shield and said one bearing ring having at least one discrete irregularity distributed along the circumference of the bearing shield and effected by a laser beam such that rotation of the bearing shield with respect to said one bearing ring is restrained.

2. The rolling element bearing assembly according to claim 1, wherein the discrete irregularity is a welding of the bearing shield and said one bearing ring.

3. The rolling element bearing assembly according to claim 1, wherein the discrete irregularity includes key means for providing a mechanical interlock between the bearing shield and said one bearing ring.

4. The rolling element bearing assembly according to claim 1, wherein the mid portion of the bearing shield is directed radially and the first periphery portion of the bearing shield includes an axially inwardly directed flange, and wherein the discrete irregularity is located at the axially outward extent of the flange.

5. The rolling element bearing assembly according to claim 1, wherein the mid portion of the bearing shield is directed radially and the first periphery portion of the bearing shield includes an axially outwardly directed flange, and wherein the discrete irregularity is located at the axially outward extent of the flange.

6. The rolling element bearing assembly according to claim 1, further comprising a second annular bearing shield contacting the other of the inner and outer bearing rings.

7. The rolling element bearing assembly according to claim 1, wherein the number of discrete irregularities is less than 9, said discrete irregularities being evenly distributed circumferentially about the first periphery portion of the bearing shield.

8. The rolling element bearing assembly according to claim 1, wherein said one bearing ring includes an annular groove and wherein the first periphery portion of the bearing shield forms a press fit in the annular groove such that movement of the bearing shield with respect to said one bearing ring is restrained in at least one axial direction.

9. The rolling element bearing assembly according to claim 1, wherein the first periphery portion of the bearing shield contacts the outer bearing ring and the second periphery portion of the bearing shield is adjacent the inner bearing ring.

10. A rolling element bearing assembly having an axis and comprising:

an inner bearing ring;

an outer bearing ring;

rolling elements between the inner and outer bearing rings; and an annular bearing shield having a first periphery portion contacting one of the inner and outer bearing rings, a second periphery portion adjacent the other of the inner and outer bearing rings, and a mid portion between the first and second periphery portions;

the first periphery portion of the bearing shield and said one bearing ring having at least one localized irregularity effected by a laser beam such that rotation of the bearing shield with respect to said one bearing ring is restrained;

wherein the localized irregularity includes a nodule in one of the first periphery portion of the bearing shield and said one bearing ring and extending into a recess in the other of the first periphery portion of the bearing shield and said one bearing ring to provide a mechanical interlock between the bearing shield and said one bearing ring.

11. A method of mounting a bearing shield comprising the steps of:

providing an outer bearing ring and an inner bearing ring with rolling elements therebetween;

positioning an annular bearing shield such that a first periphery portion of the bearing shield contacts one of the inner and outer bearing rings, a second periphery portion of the bearing shield is adjacent the other of the inner and outer bearing rings, and a mid portion of the bearing shield extends between the first and second periphery portions;

directing a laser beam against at least one of the first periphery portion of the bearing shield and said one bearing ring such that at least one discrete irregularity is effected by the laser beam and such that rotation of the bearing shield with respect to said one bearing ring is restrained.

12. The method according to claim 11, wherein the discrete irregularity is a welding of the bearing shield and said one bearing ring together by welding.

13. The method according to claim 11, wherein the discrete irregularity includes key means for providing a mechanical interlock between the bearing shield and said one bearing ring.

14. The method according to claim 11, wherein the mid portion of the bearing shield is directed radially and the first periphery portion of the bearing shield includes an axially inwardly directed flange, and wherein the discrete irregularity is effected at the axially outward extent of the flange.

15. The method according to claim 11, wherein the mid portion of the bearing shield is directed radially and the first periphery portion of the bearing shield includes an axially outwardly directed flange, and wherein the discrete irregularity is effected at the axially outward extent of the flange.

16. The method according to claim 11, further comprising a step of mounting a second annular bearing shield against the outer of the inner and outer bearing rings.

17. The method according to claim 11, wherein the number of discrete irregularities is less than 9, said discrete irregularities being evenly distributed circumferentially about the first periphery portion of the bearing shield.

18. The method according to claim 11, wherein said one bearing ring includes an annular groove and wherein the first periphery portion of the bearing shield forms a press fit in the annular groove such that movement of the bearing shield with respect to said one bearing ring is restrained in at least one axial direction.

19. The rolling element bearing assembly according to claim 11, wherein the first periphery portion of the bearing shield contacts the outer bearing ring and the second periphery portion of the bearing shield is adjacent the inner bearing ring.

20. A method of mounting a bearing shield comprising the steps of:

providing an outer bearing ring and an inner bearing ring with rolling elements therebetween;

positioning an annular bearing shield such that a first periphery portion of the bearing shield contacts one of the inner and outer bearing rings, a second periphery portion of the bearing shield is adjacent the other of the inner and outer bearing rings, and a mid portion of the bearing shield extends between the first and second periphery portions;

directing a laser beam against at least one of the first periphery portion of the bearing shield and said one bearing ring such that at least one localized irregularity is effected by the laser beam and such that rotation of the bearing shield with respect to said one bearing ring is restrained;

wherein the localized irregularity includes a nodule on one of the first periphery portion of the bearing shield and said one bearing ring and extending into a recess in the other of the first periphery portion of the bearing shield and said one bearing ring bearing shield to provide a mechanical interlock between the bearing shield and said one bearing ring.

* * * * *